3,087,929
SYNTHESIS OF BENZO[C]CINNOLINES
Francis Johnson, West Newton, Mass., assignor to The Dow Chemical Company, Midland, Mich., a corporation of Delaware
No Drawing. Filed June 2, 1960, Ser. No. 33,407
3 Claims. (Cl. 260—250)

This invention relates to a process for the preparation of c-cinnolines and, in particular, to the preparation of benzo-c-cinnolines, both in the simple form and substituted products thereof. In particular, the method is suitable for the preparation of substituted cinnolines wherein the nature of the substituents or other conditions of preparation do not permit the maintenance of strong reducing conditions.

Heretofore, cinnolines could be prepared only by rather cumbersome procedures and in relatively low yields. Typical preparations of the compound may be found described in the following journals: Ullman and Dieterle, Ber. 24, 3081 (1891); V. E. King and T. J. King, J. Chem. Soc. 824 (1945); Sandin and Cairns, J.A.C.S. 58, 2019 (1936); Tauber, Ber. 29, 2270 (1896); Richard E. Moore and A. Furst, J. Org. Chem. 23, 1504 (1958); R. S. W. Braithwaite, P. F. Holt and A. N. Hughes, J. Chem. Soc. 4073 (1958).

The difficulty in the preparation of these compounds has become such an accepted matter of fact in the art that a recent publication Elderfield, "Heterocyclic Compounds" (John Wiley Sons, Inc.), expressly states that there are no satisfactory methods of preparing this compound from o,o'-diaminodiphenyl.

It is, accordingly, a fundamental object of this invention to provide a method for the direct preparation of cinnolines from o,o'-diaminodiphenyl compounds wherein substantial yields of the compound of good purity are quite directly obtained.

Other objects and advantages of the invention will in part be obvious and in part appear hereinafter.

The invention, accordingly, is embodied in a method by which a starting aminodiphenyl compound is dissolved in an acid solution containing sodium nitrite, temperature adjusted to a level about 0° C., following which an acid stannic chloride solution of minimum volume is slowly added, with the result that a white precipitate of the stannic salt is formed. This double salt is subsequently decomposed to form the desired cinnoline by adding it in small portions to a boiling suspension of a chlorine receptor, i.e., finely powdered tin and cuprous chloride in ethyl acetate. It is possible that the mechanism of this reaction is such that metallic tin and cuprous chloride are needed to induce decomposition and to take up the chlorine released.

Decomposition of the double salt takes place virtually quantitatively and, thereafter, the suspended organic salt and inorganic materials are removed by filtration and the ethyl acetate is removed under pressure. The residual material is then extracted with benzene and the material obtained crystallized from a solvent.

Fundamentally, the process for the formation of the cinnolines, therefore, may be summarized as involving, first, the step of forming the double salt of the tetrazo derivative of the 2,2'-diaminodiphenyl compound with a tin salt, and thereafter, decomposing the tin salt under controlled conditions to obtain the desired cinnoline. In more general form, the reaction may be represented as follows:

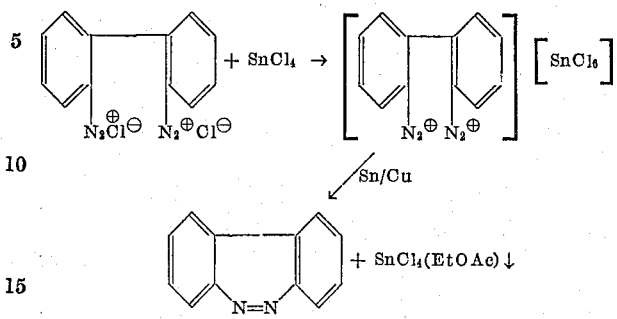

With appropriate substituents in any of the open positions in the starting diazo compound, it will be apparent that the corresponding substituted cinnoline is prepared. Typical substituted compounds prepared by this method are the following:

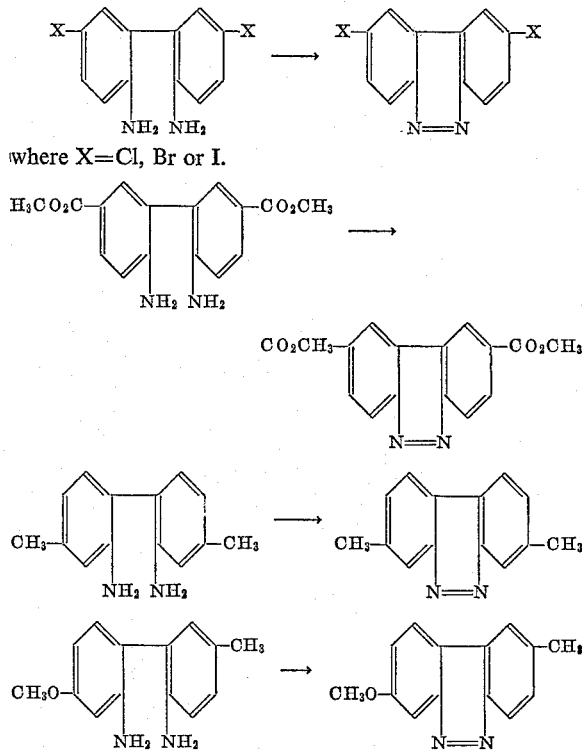

where X=Cl, Br or I.

The details of the operation of the process can be more readily understood by reference to the following specific examples:

EXAMPLE I

*The Preparation of Benzo-[c]- Cinnoline*

2,2'-diaminodiphenyl (9.2 grams) was dissolved in concentrated hydrochloric acid (50 milliliters) and water (50 milliliters). The temperature of the solution was adjusted to −3° C. and maintained at this temperature throughout the addition of sodium nitrite (7.1 grams)

in water (25 milliliters). After this addition, which took 10 minutes, stirring was continued for an additional 15 minutes. The temperature of the solution was lowered to −22° C. and a solution of stannic chloride pentahydrate (20 grams) in the minimum of volume of concentrated hydrochloric acid, was added slowly. A white precipitate formed and, at the end of the addition of the stannic salt, this was collected on a previously cooled Buchner funnel. The solid was washed twice with cold (−10° C.) 5 percent hydrochloric acid, twice with cold ethanol and twice with ether. The material was then bottled and kept in a refrigerator. The yield of the double salt was quantitative.

Decomposition of this salt was carried out by adding it in small portions to a boiling suspension of very finely powdered tin (8 grams) and cuprous chloride (1 gram) in ethyl acetate (100 milliliters). After decomposition was complete, the suspended organic salts and inorganic material were removed by filtration and the ethyl acetate removed under reduced pressure. The residual solid was extracted with benzene; the benzene removed by evaporation and the material thus obtained crystallized from ethyl ether. A second crystallization from ethyl ether gave the pure product, benzo[c]cinnoline, M.P. 155° (7.5 g., 83% yield). The infrared spectrum of this material was identical with an authentic sample.

What is claimed is:

1. The method of preparing benzo[c]cinnolines which comprises reacting a compound of the formula

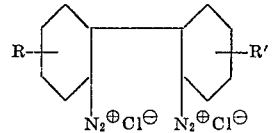

wherein R and R′ represent substituents selected from the group consisting of hydrogen, halogen, lower alkyl, lower alkoxy, and lower carbalkoxy groups with stannic chloride to form an addition salt therewith; and, thereafter reacting said addition salt in an inert organic liquid medium with metallic tin and cuprous chloride as chlorine receptor to form the corresponding benzo-c-cinnoline compound.

2. The method in accordance with claim 1 in which the said medium is a solvent boiling in the range 50°–100° C.

3. The method in accordance with claim 1 in which the said medium is ethyl acetate.

References Cited in the file of this patent
UNITED STATES PATENTS 2,053,745 Schnitzspahn _____ Sept. 8, 1936
2,827,449 Kesler _____ Mar. 18, 1958